3,737,393
PROCESS FOR THE PREPARATION OF A
DIALKYL MAGNESIUM COMPOUND
Menno de Vries, Sittard, Netherlands, assignor to
Stamicarbon N.V., Heerlen, Netherlands
No Drawing. Filed June 3, 1970, Ser. No. 43,238
Claims priority, application Netherlands, June 4, 1969,
6908526
Int. Cl. C07f 3/02
U.S. Cl. 252—431 R       10 Claims

ABSTRACT OF THE DISCLOSURE

A process for preparing solutions of dialkyl magnesium compounds is disclosed, wherein an alkyl halogenide is reacted with magnesium, and the reaction product is contacted with an organo-aluminum compound during and/or after the reaction to form a solution of dialkyl magnesiuum and aluminum compound. Such solutions are useful in the polymerization of $\alpha$-alkylenes, such as ethylene, for instance.

BACKGROUND OF THE INVENTION

Diorgano-magnesium compounds have been prepared by the reaction of an organo-halogenide with magnesium in an ether medium, followed by the addition of dioxane. The diorgano-magnesium compounds obtained from such a process cannot be completely freed of ether. As known to the art, the ether may have an adverse effect in certain applications for the diorgano-magnesium compounds, particularly in Ziegler-Natta polymerization processes, so that such a process has major disadvantages.

If the above reaction is conducted in an ether-free dispersion medium, for instance, in a hydrocarbon medium, the organo-magnesium compounds are normally obtained as a precipitate having about the gross composition of organo-magnesium halides. Such insoluble organo-magnesium compounds have the disadvantage of being rather difficult to handle, as the suspended compound is liable to settle, and thus problems are posed in supplying such a suspension to a polymerization process, particularly in a continuous process where such suspension must be supplied continuously.

It is known (Ann. 605, 93–97, 1957) that diethyl magnesium and triethyl aluminum yield a heptane-soluble complex having the composition $Mg(AlEt_4)_2$. It has further been described that if less than the equivalent amount of triethyl aluminum is employed, the amount of diethyl magnesium going into solution is at most equal to that corresponding to the composition of the complex. The same holds for the corresponding methyl compounds.

SUMMARY OF THE INVENTION

The present invention provides a process for preparing ether-free soluble dialkyl-magnesium compounds which contain only little magnesium halogenide and remain dissolved in dispersion media for extended periods of time. The dialkyl-magnesium compound is prepared by reaction of an alkyl halogenide with magnesium. The organo-magnesium compound is contacted, at least during and/or after the aforesaid reaction, with an organo-aluminum compound in an amount smaller than 200 mol.-percent with respect to the magnesium compound, whereby a solution of a dialkyl-magnesium and an aluminum compound is formed.

DESCRIPTION OF THE INVENTION

The dialkyl-magnesium compounds prepared according to the present invention remain dissolved in an appropriate dispersion medium for extended periods of time, and in numerous situations such dissolution can be considered permanent. Such solutions are a convenient vehicle for introducing the dialkyl-magnesium compounds into polymerization systems, wherein the dialkyl-magnesium compounds are used as a catalyst component. The dialkyl-magnesium compounds are particularly useful as a catalyst component in the polymerization of $\alpha$-alkylenes, such as ethylene or propylene, as disclosed in the application filed in the names of Cornelis E. P. V. van den Berg, Leonard Jozef Gerard Tummers, Jan M. Houben and Theodorus Pulles, entitled "Process for the Preparation of Alkene Polymers," filed on even date herewith, Ser. No. 43,237, the disclosure of which is hereby incorporated by reference to the extent necessary to understand the use of the dialkyl-magnesium compounds.

The dialkyl-magnesium compounds of the present invention are prepared by reacting an alkyl halogenide with magnesium and contacting the reaction product with an organo-aluminum compound. Such contact may be during and/or after the aforesaid reaction. In any event, a solution of the dialkyl-magnesium and the organo-aluminum compound is prepared.

The reaction of the magnesium with the alkyl halogenide may be conducted using an excess of alkyl halogenide as the only dispersion medium. However, it is preferred that a non-complexing ether-free, liquid dispersion medium be used. When such inert, ether-free, liquid dispersion medium is used, it is unnecessary to use an excess of alkyl halogenide, with respect to the quantity of magnesium, and stoichiometric amounts of the reactants may be used. Suitable inert, ether-free liquid dispersive mediums include aliphatic hydrocarbons such as pentane, heptane, pentamethyl heptane and gasoline or other petroleum fractions, cycloaliphatic hydrocarbons such as cyclohexane, methyl cyclohexane, and benzene, and halogenated aliphatic or cycloaliphatic hydrocarbons such as chlorobenzene. Mixtures of such liquid dispersion media may be used as desired. Aliphatic and cycloalphatic hydrocarbons having 5 to 20 carbon atoms are preferred, especially alkyl, cycloalkyl, aryl and alkaryl hydrocarbons of 6 to 15 carbon atoms.

The preferred alkyl halogenides are primary alkyl halogenides of 1–25 carbon atoms other than methyl or ethyl-chloride such as propyl, hexyl, octyl, and stearyl halogenides, and, more preferably, an ethyl or n-butyl halogenide. For reasons of economy, chlorides are conveniently used, but bromides, iodides or a mixture of halogenides may be employed, as desired. The term "alkyl halogenides," as used herein, is to be understood to also include cycloalkyl halogenides and aralkyl halogenides, for instance, cyclopentyl chloride, cyclohexyl chloride and $\omega$-chloro-n-propyl benzene.

The metallic magnesium is preferably used in a finely divided state, for instance, as a powder with a particle size less than $100\mu$. With such fine particle size, it is actually unnecessary to activate the metal. However, it is to be understood that other forms of metallic magnesium may also be used, for instance, shavings and ribbons, and the metal may be activated by any conventional method known to the art, for instance, with a small amount of a precipitate from a previous Grignard reaction.

The reaction between the metallic magnesium and the alkyl halogenide should be between 30° and 200° C., and preferably between 50 and 150° C. The pressure may vary between wide limits, and is not critical, but should be at least high enough that the reaction medium and the reactants are substantially in the liquid state.

The reaction product obtained by the reaction of the metallic magnesium and the alkyl halogenide is contacted with an organo-aluminum compound to obtain a solution of the dialkyl magnesium and an aluminum compound. The organo-aluminum compound may be added to the reaction mixture during and/or after the reaction, and in some cases it will be found preferred to use the organo-aluminum compound both during and after the reaction. If desired, the organo-aluminum compound may be added to the dispersion medium before the reaction of the metallic magnesium and the alkyl halogenide. The organo-aluminum compound is preferably added as such but, if desired, may also be prepared in situ, for instance, by the reaction of an aluminum compound, such as an aluminum chloride, aluminum bromide, or even compounds like aluminum stearate, with the organo-magnesium compound already prepared.

The preferred organo-aluminum compound has a general formula $R_mAlX_n$ wherein R is a hydrocarbyl group, for instance, an alkyl, cycloalkyl, aralkyl, aryl or alkaryl group, having from 1–25 carbon atoms, X is a halogen atom or an alkoxy group of 1–25 carbon atoms, $m$ is an integer of 1–3 and $n$ is an integer of 0–2, with the sum of $m$ and $n=3$ (that is, $n=3-m$). Mixtures of organo-aluminum compounds may be used as desired. Suitable organo-aluminum compounds include diethyl aluminum chloride, mono isobutylbromide and aluminum ethyl sesquichloride. Preferably, an alkyl aluminum compound is used, more preferably a trialkylaluminum compound, especially a tri (lower alkyl) aluminum compound, such as triethyl aluminum or tributyl aluminum. The organo-aluminum compound is used in an amount of 0.1 to 200 mole percent, based on the moles of magnesium compound, and preferably about 1–150 mole percent. The optimum quantity of organo-aluminum compound in a given situation depends upon the nature of the alkyl group, the halogenide, and the dispersion medium used, but can be easily determined by routine experimentation, well within the skill of those in the art.

The invention will be understood more readily by reference to the following examples; however, these examples are intended to illustrate the invention and are not to be construed to limit the scope of the invention.

Control example
(According to the prior art)

7.3 grams magnesium powder (0.3 gram-atoms), having an average particle size of 100 microns, under a nitrogen atmosphere were added, with stirring, to 10 percent of a solution of 27.8 grams of n-butyl chloride (0.3 moles) in 200 ml. of dry heptane. 100 milligrams of an old precipitate from a previous reaction were added, and the mixture heated to boiling, whereupon after a few minutes the reaction started. The remaining butyl chloride solution, i.e., the remaining 90 percent of the above solution) was added dropwise over a period of 35 minutes, and then the reaction mixture was boiled for an additional period of one hour under a reflux cooler (exit temperature of 30° C.). After the completion of the reaction, the solid matter was allowed to settle, and a sample of the sepernatant liquid was analyzed for alkaline constituents. The analysis indicated that no organo-magnesium compound was dissolved in the liquid. Titration of a sample of agitated slurry of the settled solid matter indicated that the precipitate contained 242 milligram-equivalents of the organo-magnesium compound.

Example I

The reaction between metallic magnesium and butyl chloride was conducted in the same manner as described in the Control Example. However, 30 minutes after the completion of the dropwise addition of the remainder of the butyl chloride, 14 millimoles of triethyl aluminum dissolved in 14 ml. of heptane were added to the reaction mixture, and thereafter the reaction mixture was boiled for another 30 minutes. After the precipitate had settled, titration of a sample of the supernatant clear liquid indicated that such liquid contained 0.56 moles of dibutyl magnesium and contained less than 7 mg. ion chlorine per liter. Titration of an agitated slurry produced from the precipitate indicated that all of the dibutyl magnesium was dissolved in the supernatant liquid. After standing 200 days at room temperature, the dibutyl magnesium remained completely dissolved in the supernatant liquid.

Example II

Metallic magnesium and butyl chloride were reacted in the manner described for the control example, except 6.5 millimoles of triethyl aluminum were added to the reaction mixture 30 minutes after the completion of the dropwise addition of the remainder of the butyl chloride. The reaction mixture was boiled for an additional period of one hour after the addition of the triethyl aluminum. Analyses of the reaction product after cooling and settling indicated that a large part of the dibutyl magnesium was dissolved in the heptane, the solution being 0.299 molar. Thereafter, one millimole of triethyl aluminum was added to the reaction mixture. After boiling for 30 minutes, cooling and settling, the liquid solution was 0.334 molar. Thereafter, another one millimole of triethyl aluminum was added to the reaction mixture and the mixture was again boiled for 30 minutes, cooled and allowed to settle whereupon titration indicated the molarity was 0.378. An additional one millimole of triethyl aluminum was added to the reaction mixture, with the boiling, cooling and settling as indicated above. The molarity was found to have increased to 0.409.

Titration of a sample of the agitated slurry, based on the settled solid matter, indicated that all of the organo-magnesium compound was dissolved in the heptane. After 10 days, the heptane solution concentration had not changed. The clear supernatant liquid was analyzed as containing 423 milligram-ions of Mg, 48 milligram-ions of Al and less than 5 milligram ions of Cl per liter.

Example III

Example I was repeated except that 6.6 gram-atoms of magnesium were added to a solution of 6.0 moles of butyl bromide and 0.18 moles of tributyl aluminum in 3.2 liters of a 1:1 weight mixture of gasoline and heptane. The liquid solution obtained was 0.735 molare in dibutyl magnesium.

Example IV 8 grams of magnesium (0.33 gram-atoms) were boiled for five minutes in a solution of 6 millimoles of diethyl aluminum chloride in 25 ml. of a 1:1 weight mixture of gasoline and heptane. Thereafter, 10 percent of a solution of 41 grams of butyl bromide (0.3 moles) in 175 ml. of the 1:1 gasoline-heptane mixture were added. After the reaction started (about 2 minutes after the addition of the indicated portion of the butyl bromide solution, with the reaction mixture maintained at a boil), the remaining 90 percent of the butyl bromide solution was added dropwise over a period of 60 minutes. At the completion of the reaction (30 minutes after the completion of the butyl bromide solution addition), a solution was obtained which was 0.46 molar in dibutyl magnesium.

Example V 0.7 gram-atoms of magnesium were reacted, with 10 percent of a mixture of 0.35 moles of butyl bromide, 11 millimoles of triethyl aluminum, and 425 ml. of cyclohexane, for a period of 5 minutes, whereupon the remaining 90 percent of the mixture was gradually added over a period of 30 minutes. After the completion of the remaining portion of the mixture, the reaction components were boiled for an additional period of 60 minutes. The solution obtained at the end of the reaction was 0.344 molar in dibutyl magnesium, and the concentration of the solution did not change over a three-months storage period at room temperature. Analysis of the clear solution indicated that the solution contained 367 milligram-ions of magnesium, 28 milligram-ions of aluminum and 47 milligram-ions of bromide per liter.

Example VI

A mixture of 0.250 gram-atoms of magnesium and 0.006 gram-atoms of aluminum, both in powder form (of 100 and 50 microns, respectively), was reacted with 0.25 moles of butyl bromide in 200 ml. of methyl cyclohexane at 100° C. for about 90 minutes. The reaction mixture was then further diluted with 200 ml. of gasoline. The clear supernatant liquid was 0.238 molar in dibutyl magnesium, and titration of a sample of a stirred slurry of the precipitated solid matter indicated that all of the organo-magnesium compound was dissolved. After two months storage, the concentration of the solution was unchanged. Analysis indicated that the solution contained 253 milligram-ions of Mg, 11 milligram-ions of Al and 26 milligram-ions of Br per liter.

Example VII

Dibutyl magnesium was prepared by the method described for the Control Example from 0.5 gram atoms of magnesium powder and 0.45 milligrams of butyl bromide in 300 ml. of a 1:1 value mixture of gasoline and heptane. After completion of the reaction and cooling, all of the organo-magnesium compound crystallized from the reaction solution, and, upon titration, no organo-magnesium compound was found in the clear supernatant liquid. One millimole of triethyl aluminum was added to the reaction mixture, which was heated to boiling for one hour and then allowed to settle, whereupon the clear supernatant liquid was analyzed. This procedure was repeated several times, with the results listed in Table I below. At the end of the triethyl aluminum additions, all of the dibutyl magnesium was dissolved in the clear supernatant liquid.

TABLE 1

| Millimoles of triethyl aluminum added (as a 1-molar solution) | Analysis of clear solution (milligram-ions per liter) | | | Alkaline constituents (gram equivalents per liter) |
|---|---|---|---|---|
| | Mg | Al | Br | |
| 1 | 133 | 2 | 17 | 0.24 |
| 2 | 252 | 6 | 29 | 0.45 |
| 3 | 345 | 10 | 43 | 0.65 |
| 4 | | (¹) | | 0.83 |
| 5 | | (¹) | | 0.96 |
| 6 | 567 | 17 | 69 | 1.05 |
| 7 | 603 | 21 | 77 | 1.13 |
| 10 | 596 | 32 | 67 | 1.12 |
| 20 | 578 | 63 | 71 | 1.11 |
| 30 | 550 | 93 | 60 | 1.07 |
| 30 ² | 542 | 95 | 47 | 1.07 |

¹ Not determined.
² Determined again after 5 months.

Example VIII

A precipitate was obtained by the reaction of ethyl bromide and metallic magnesium in a gasoline-heptane mixture, in a manner similar to the Control Experiment. No organo-magnesium compound was found to be in solution.

Triethyl aluminum was added to the reaction mixture in an amount corresponding to 45 mole percent, based on the moles of magnesium, said thereafter the reaction mixture was boiled for 10 minutes. Subsequent analysis indicated all of the dimethyl magnesium has gone into solution, with the clear solution containing 57 milligram-ions of magnesium, 24 milligram-ions of aluminum, and less than 5 milligram-ions of bromine per liter.

Example IX

A solution of 0.3 gram moles of ethyl bromide in 125 ml. of 1:1 weight mixture of gasoline-heptane was added dropwise to a boiling mixture of 0.3 gram atoms of metallic magnesium (average particle size 100 microns), 75 millimoles of triethyl aluminum and 75 ml. of the 1:1 gasoline-heptane mixture, with evolution of gas during the reaction. After settling of the precipitate, a clear solution, containing 309 milligram-ions of Mg, 306 milligram-ions of Al and 36 milligram-ions of Br per liter, was obtained. The concentration of the solution was unchanged after one month storage.

Example X

A solution of 0.4 gram moles of butyl chloride in 375 ml. of heptane was added dropwise to a boiling mixture of 0.4 gram atoms of metallic magnesium (200 micron average particle size), and 14 millimoles of aluminum stearate in 25 ml. of heptane. The addition of butyl chloride was complete after 30 minutes. After cooling, and settling, the clear supernatant solution was 0.228 molar in dibutyl magnesium, and the solution concentration was unchanged after one week.

Example XI 0.33 gram atoms of metallic magnesium (100 micron average particle size) and 0.3 gram moles of butyl chloride was reacted in 300 ml. of heptane using the method of the Control Experiment. A slurry was obtained which, upon standing, produced a precipitate of solid material. 12 millimoles of aluminum bromide were added to the reaction mixture, with boiling for 15 minutes. After settling of the precipitate, analysis indicated that all of the organo-magnesium compound had dissolved in the supernatent liquid. The solution was separated from the precipitate and after 3 months the concentration of such solution was unchanged. An analysis indicated that the solution contained 355 milligram-ions of Mg, 37 milligram-ions of Al and 36 milligram-ions of halogen, per liter.

Example XII 0.3 gram atoms of magnesium were added to 2 millimoles of triethyl aluminum and 10 percent of a solution of 0.3 moles of butyl chloride in 200 ml. of heptane. The reaction started after the mixture had been boiled for 10 minutes, whereupon the remaining portion of the butyl chloride solution was added dropwise over a period of 50 minutes. After the completion of the addition of the remainder of the butyl chloride solution, the reaction mixture was boiled for another 30 minutes and then 11 more millimoles of triethyl aluminum were added thereto, with boiling for another 15 minutes. After the precipitate had settled, the clear supernatant solution was 0.510 molar in dibutyl magnesium, and all of the organo-magnesium compound had dissolved. Analysis of the solution indicated it contained 511 milligram-ions of Mg, 55 milligram-ions of Al, and less than 0.5 milligram-ions of Cl. The concentration of the solution was unchanged after three months storage.

Example XIII

To a slurry of 32 millimoles of the reaction product of magnesium and butyl chloride in 100 ml. of benzene, prepared according to the procedure of the Control Example, 5 ml. of one molar triethyl aluminum in benzene was added, whereupon the reaction mixture was boiled for one hour. A clear supernatant liquid was obtained which was 0.155 molar in dibutyl magnesium.

Example XIV

To a slurry of the reaction product of magnesium and butyl bromide, prepared according to the method of Example XIII, 3 ml. of one molar triethyl aluminum and benzene was added with subsequent boiling for one hour. A solution was obtained which was 0.338 molar in dibutyl magnesium, and the solution concentration was unchanged after one month's storage. The solution contained 365 milligram-ions of Mg, 12 milligram-ions of Al and 55 milligram-ions of Br per liter.

What is claimed is:
1. A process for the preparation of a solution in an ether-free, liquid dispersion medium of a dialkyl-magnesium compound and an aluminum compound, said process comprising reacting an alkyl halogenide of 1–25 carbon atoms with metallic magnesium in a non-complexing, ether-free liquid dispersion medium or an excess of said alkyl halogenide to form an organo-magnesium compound and contacting said organo-magnesium compound in said dispersion medium with an amount smaller than 200 mole percent, based on the moles of magnesium compound, of an organo-aluminum compound of the general formula $R_mAlX_n$, wherein R is selected from the group consisting of alkyl, cycloalkyl, aralkyl, aryl and alkaryl having 1–25 carbon atoms, X is a halogen atom or an alkoxy group of 1–25 carbon atoms, m is any value of 1–3, n is any value of 0–2 and $m+n=3$, whereby a solution containing said dialkyl magnesium compound and said aluminum compound dissolved in said liquid dispersion medium is formed.

2. A process as claimed in claim 1, wherein said medium is a hydrocarbon medium.

3. The process as claimed in claim 1, wherein said halogenide is selected from the group consisting of ethyl halogenides and n-butylhalogenides.

4. The process as claimed in claim 1, wherein said organo-aluminum compound is an alkyl aluminum compound.

5. The process as claimed in claim 4, wherein said alkyl aluminum compound is a trialkyl aluminum compound.

6. The process as claimed in claim 1, wherein said organo-aluminum compound is used in an amount of 0.5 to about 200 mole percent, based on the moles of magnesium compound.

7. The process as claimed in claim 6, wherein the amount of organo-aluminum compound is about 1 to about 150 mole percent, based on the moles of magnesium compound.

8. The process as claimed in claim 1, wherein said reaction is conducted at a temperature at between 30° and 200° C.

9. The process as claimed in claim 8, wherein said temperature is between 50° and 150° C.

10. The product produced by the process of claim 1.

References Cited

UNITED STATES PATENTS

| | | | |
|---|---|---|---|
| 3,526,604 | 9/1970 | Wadsworth | 252—431 R X |
| 3,143,577 | 8/1964 | Bryce-Smith et al. | 260—655 G |
| 2,899,415 | 8/1959 | Truett | 252—431 R X |

FOREIGN PATENTS

| | | | |
|---|---|---|---|
| 260,371 | 7/1965 | Australia | 260—665 G |
| 1,167,835 | 4/1964 | Germany | 260—665 G |

PATRICK P. GARVIN, Primary Examiner

U.S. Cl. X.R.

260—665 G, 93.7, 94.9 R